United States Patent

[11] 3,591,818

| [72] | Inventor | Garland L. Fulton<br>Wayne, Pa. |
|---|---|---|
| [21] | Appl. No. | 805,430 |
| [22] | Filed | Mar. 10, 1969 |
| [45] | Patented | July 6, 1971 |
| [73] | Assignee | Process Industries, Incorporated<br>Huntingdon Valley, Pa. |

[54] DRIVE COUPLING
6 Claims, 2 Drawing Figs.

[52] U.S. Cl. .................................................. 310/104, 310/90
[51] Int. Cl. .................................................. H02k 49/10
[50] Field of Search .......................................... 310/103, 104, 90

[56] References Cited
UNITED STATES PATENTS

| 1,911,960 | 5/1933 | Lipman | 310/104 |
|---|---|---|---|
| 1,954,014 | 4/1934 | Lipman | 310/104 |
| 2,246,777 | 6/1941 | Bordeaux et al. | 310/86 |
| 2,858,461 | 10/1958 | Hague et al. | 310/104 |
| 3,052,805 | 9/1962 | Hudson | 310/104 |

Primary Examiner—D. X. Sliney
Attorney—Zachary T. Wobsensmith, II

ABSTRACT: An electromagnetic responsive coupling for shafts and the like, one magnetic responsive component being of soft iron, high intensity permanent magnetic material of metal or ceramic, with the other and outer component being electromagnetic with power supply, supporting bearings being provided to retain alignment, and the inner and outer components being isolated to prevent fluid communication therebetween.

PATENTED JUL 6 1971

3,591,818

INVENTOR
GARLAND L. FULTON

BY
B. T. Wobensmith 2nd

ATTORNEY

DRIVE COUPLING

BACKGROUND OF THE INVENTION

1. Field of the Invention

This invention relates to couplings for shafts and the like in which magnetic responsive components are provided, one within the other, the outer component being energized from a source of electric energy.

2. Description of the Prior Art

It has heretofore been proposed to provide couplings for driving shafts and the like employing magnets in driving permanent spaced relation to driven permanent magnets. Such magnets have limited flux density and with higher horsepower units difficulties occur in starting due to inertia, and slipping. With the structures heretofore proposed, also, demagnetization occurs with aging thereby reducing the effectiveness of the coupling.

If the magnets of one component were enclosed or encased this frequently resulted in a shielding and loss of part of the magnetic effect so as to reduce the available force.

SUMMARY OF THE INVENTION

In accordance with the invention a coupling for shafts or the like is provided having interacting magnetic coupling components, one of which is energized from a source of electric energy, the components being shielded and isolated from fluid communication therebetween while adequately supported.

It is the principal object of the present invention to provide a magnetic coupling which is simple in construction and free from inertia effects and slipping in use.

It is a further object of the present invention to provide a high power magnetic coupling which is suitable for use with couplings for transmission of many horsepower.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which.

Figure 1:
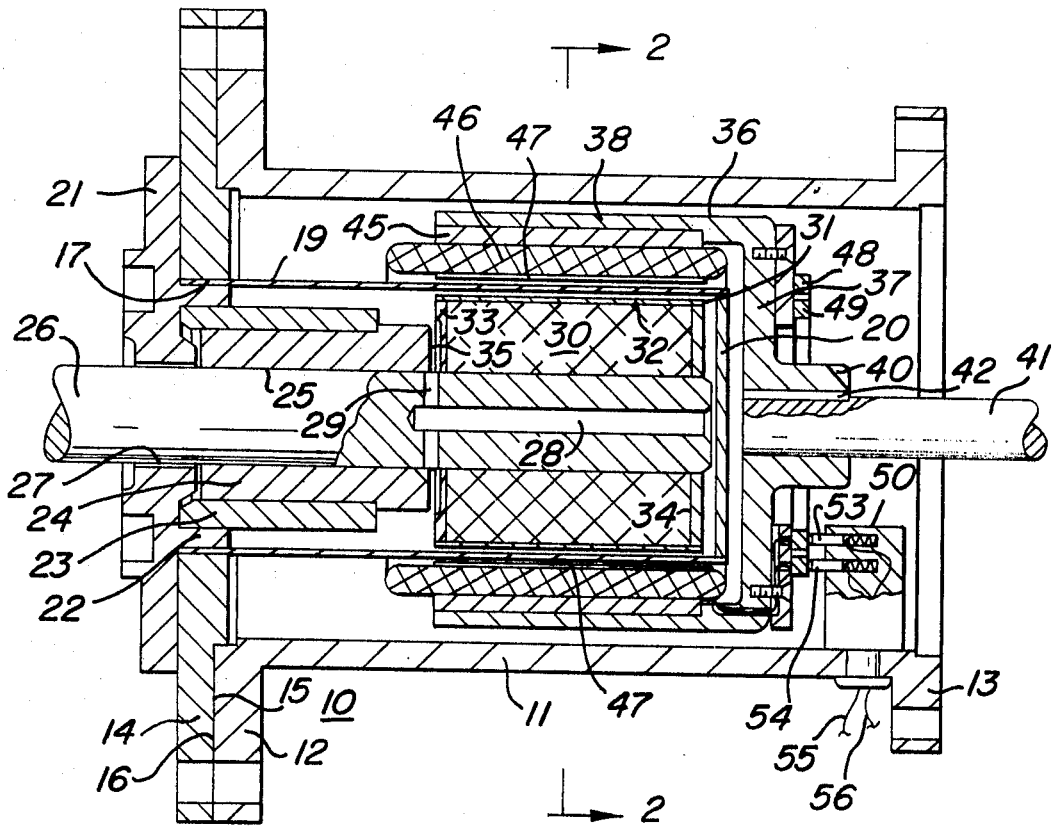
FIG. 1 is a longitudinal central sectional view of a coupling in accordance with the invention.
Figure 2:
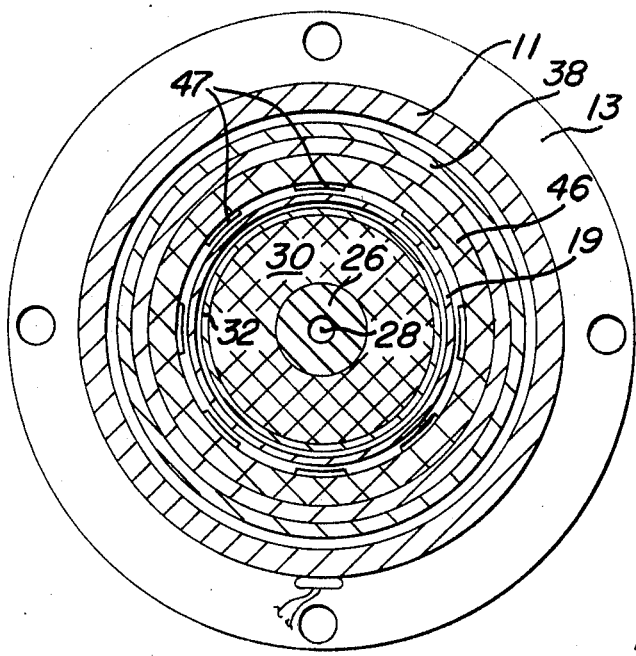
FIG. 2 is a transverse sectional view taken approximately on the line 2-2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a fixed housing 10 is shown having a central cylindrical portion 11 and end flanges 12 and 13. The end flange 12 can have an outer end closure 14 engaged therewith and in fluid tight relation thereto along meeting faces 15 and 16 of the flange 12 and the closure 14. The closure 14 has a central bore 17 within which the one end of cylindrical sleeve 19 is secured. The sleeve 19 is preferably of nonmagnetic responsive material and the thickness is determined by the pressure differential effective thereon. The sleeve 19 at the end opposite its mounting end in the bore 17 has a plate 20 closing its free end.

The sleeve 19 and plate 20 can be of any desired material such as stainless steel or synthetic plastic so long as it has the requisite physical and chemical properties for its field of service.

An inner end closure 21 is provided having a rim 22 thereon extending within and engaging the cylindrical sleeve 19 and having a bearing carrying sleeve 23 mounted therein.

The bearing sleeve 23 has mounted thereon a bearing bushing 24 with a central longitudinal opening 25 for a driven shaft 26 which extends outwardly through a bore 27 in the end closure 21.

The shaft 26, at its inner end, has a magnetic responsive or follower member 30 thereon which may be of any desired material such as soft iron or steel, ceramic ferromagnetic material, high intensity magnetic metallic materials such as Alnico, and may have a plurality of N and S poles peripherally disposed.

The shaft 26 may have a longitudinal passageway 28 and radial passageways 29 for pressure equalization as well as for fluid flow for lubrication and cooling.

The magnetic responsive component 30 may be enclosed within a casing 31 having an outer cylindrical enclosing housing 32 and end walls 33 and 34.

The clearance space between the periphery of the magnetic responsive component 30 and the interior of the sleeve is preferably kept to a minimum to reduce flux leakage.

The bearing bushing 24 has an end face 35 for contact with the wall 33 and acts as a thrust bearing for the component 30.

Within the housing 10, and in surrounding relation to the sleeve 19, a cap-shaped carrier 36 is provided having a radial wall 37 and a cylindrical wall 38.

The carrier 36 has a longitudinal boss 40 secured thereto within which a driving shaft 41 is secured such as by a key 42.

The carrier 36, in the interior of the wall 38 carries an electromagnetic element 45 which has windings 46 and pole pieces 47. The number of pole pieces and the number of pairs of poles preferably are in correspondence so that a desired pole to pole relation is provided.

The carrier 36 on the exterior of the radial wall 37 is provided with electrically insulated conductor rings 48 and 49 which are connected to the windings 46 for supplying electric current thereto for energization thereof and of the pole pieces 47.

The housing 10 also has carried thereon a contact block 50 of insulating material within which brushes or contact pins 53 and 54 are carried, spring urged to engage the rings 48 and 49. The contact pins 53 and 54 are connected by conductors 55 and 56 to any suitable source of electric energy (not shown) to provide the requisite flux at the pole pieces 47.

In use, and when the shafts 41 and 26 are to be coupled, electric energy is supplied to the windings 46 to energize the pole pieces 47. Upon rotation of the shaft 41 the shaft 26 will be rotated therewith.

The high flux density available at the flux for the pole pieces 47 coacting with the flux from the poles of the magnetic follower component 30 provides an effective drive, releasable if desired, yet free from undesired slipping.

I claim:

1. A coupling comprising
a housing having a cylindrical portion and an end flange,
means at one end of said housing closing said end of said housing,
said means including a rim with a sleeve extending longitudinally within said housing from said rim and having a closed end spaced from said rim,
said means having a shaft bearing carried thereby,
a shaft extending within said housing from one end thereof and terminating within said sleeve and having a cylindrical pole piece member thereon,
said pole piece member being disposed between said closed end of said sleeve and said bearing,
a shaft extending within said housing from the other end thereof and having a cup-shaped carrier secured thereto, and extending in radially spaced surrounding relation to said pole piece member,
said carrier having a plurality of windings and pole pieces energized thereby, and
means for energizing said windings including conductor rings mounted on said carrier and contact members connected to a source of electric energy and engaging said conductor rings.

2. A coupling as defined in claim 6 in which
said pole piece member has an enclosing casing therearound interiorly of said sleeve.

3. A coupling as defined in claim 6 in which
said means includes an outer end closure member closing one end of the space within said housing exteriorly of said sleeve.

4. A coupling as defined in claim 3 in which
said means includes an inner end closure member closing the interior space at one end of said sleeve.

5. A coupling as defined in claim 6 in which
one of said shafts is an input shaft and the other is an output shaft, and
sand input shaft has said carrier secured thereto.

6. A coupling as defined in claim 1 in which cooling means is provided including a fluid passageway in said shaft between opposite ends of said ends of said cylindrical pole piece and the space between said cylindrical pole piece and said sleeve.